Sept. 27, 1932.  H. E. CURTIS  1,879,843
POWER TRANSMISSION
Filed Sept. 30, 1930    2 Sheets-Sheet 1
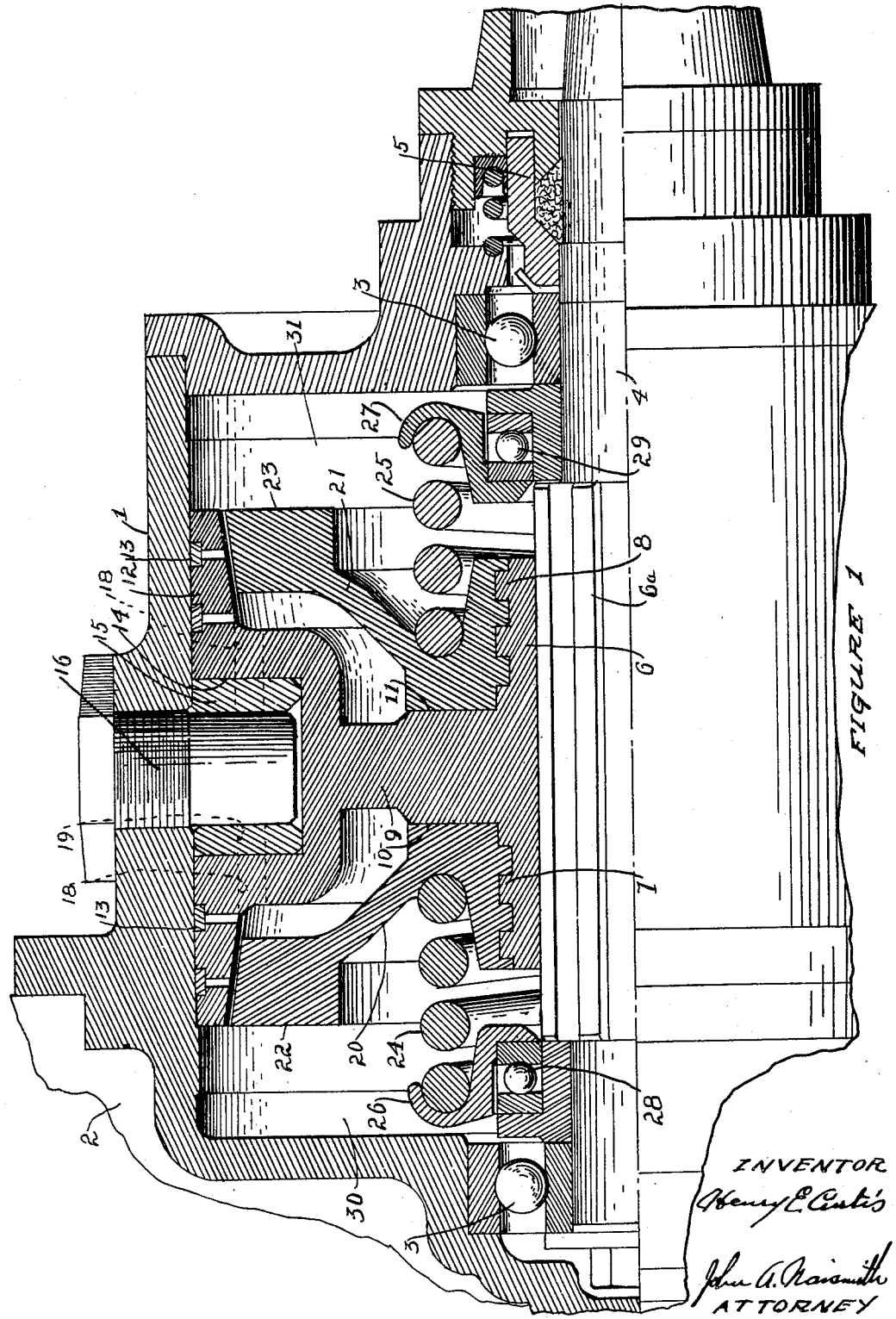
INVENTOR
Henry E. Curtis
John A. Naismith
ATTORNEY Sept. 27, 1932. H. E. CURTIS 1,879,843
POWER TRANSMISSION
Filed Sept. 30, 1930 2 Sheets-Sheet 2
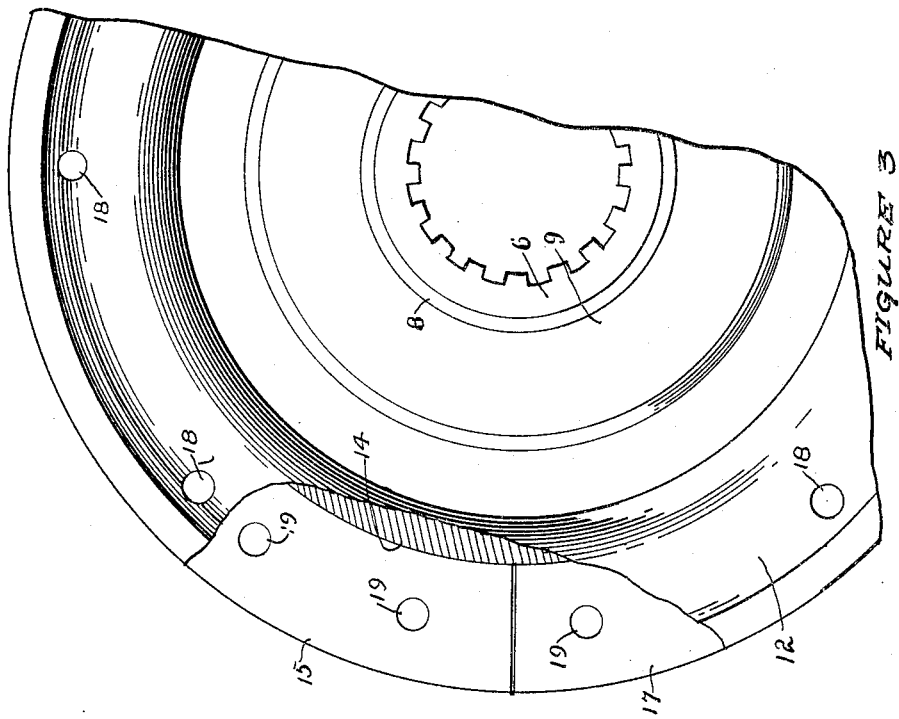
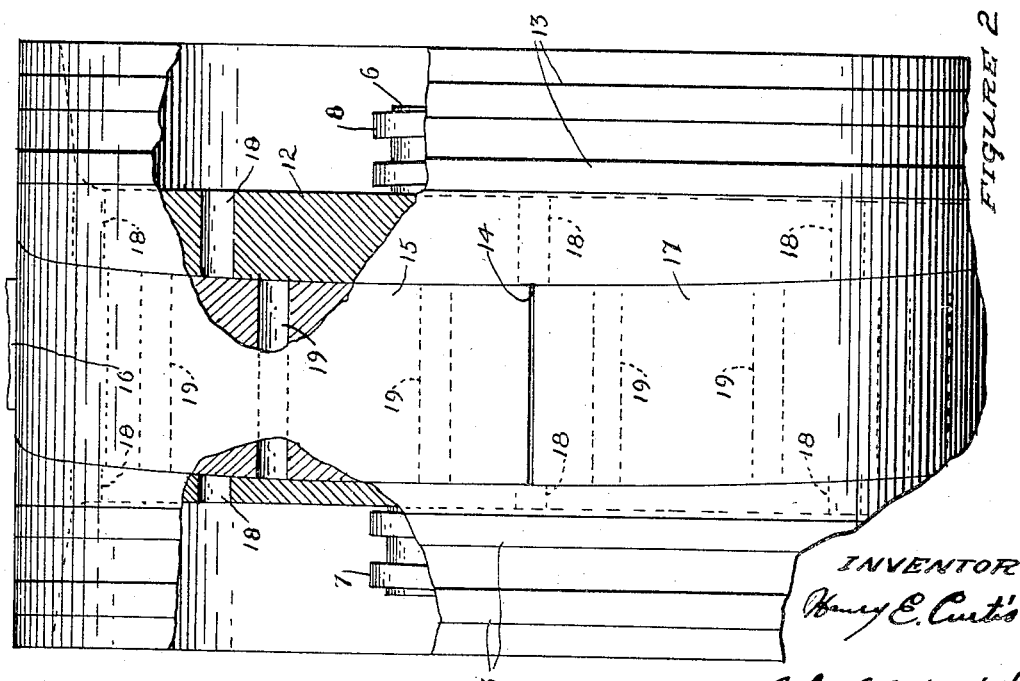
INVENTOR
Henry E. Curtis
ATTORNEY Patented Sept. 27, 1932

1,879,843

UNITED STATES PATENT OFFICE

HENRY E. CURTIS, OF SAN JOSE, CALIFORNIA

POWER TRANSMISSION

Application filed September 30, 1930. Serial No. 485,538.

It is the prime object of the invention to provide an automatic speed changing device between a driving shaft and a driven shaft, particularly for use in the automotive industry, such as between the driving and driven shafts of a motor vehicle, reference being made to my copending applications bearing Serial Number 442,902, filed April 9, 1930, and Serial Number 417,991, filed January 2, 1930.

It is also an object of the invention to provide a means of the character indicated that will operate positively and smoothly at all speeds, and one that will be economical to manufacture, simple in form and construction, small and compact, of few parts, and highly efficient in its practical application.

In the drawings:

Figure 1 is a side elevation of the device, partly in section.

Figure 2 is a side elevation of the driving ring and the collar or piston actuated thereby.

Figure 3 is a face view of the parts shown in Figure 2, part broken away.

In the embodiment of the invention shown, I provide a housing 1 mounted upon the flywheel 2 of an engine not shown, and mounted on bearings 3 in this housing is a driven shaft 4, passing through a packing gland 5. About the central portion of shaft 4 within the housing 1 are a plurality of longitudinally disposed ribs 6a to form a part of a sliding multiple-spline fitting.

At 6 is shown a grooved sleeve slidably mounted on shaft 4 and forming the complementary portion of the multiple-spline fitting, this sleeve being oppositely threaded as at 7 and 8 and having a central radially directed web 9 formed thereon and provided with oppositely directed seats at 10 and 11. On the outer portion of the web is formed an annular head 12 fitting with rings at 13 to engage the inner surface of the annular housing 1, and centrally disposed in the periphery of head 12 is formed a symmetrical cam groove 14 entirely encompassing the same. A yoke 15 is seated in groove 14 and fitted with a pin 16 threaded into and through housing 1. That portion of the groove not filled by yoke 15 is fitted with a freely sliding member 17 complementary to yoke 15. An annular row of equally spaced holes 18 is formed in head 12, and a similar row is formed in the yokes 15 and 17 as indicated at 19. The holes 18—19 are so placed that they will move alternately into and out of alignment when a relative rotative movement is set up between the yokes and the head, thereby functioning as a valve for the purpose hereinafter described. There are preferably a larger number of holes in the yokes than in the head.

Mounted upon the threaded ends 7 and 8 of sleeve 6 are discs 20 and 21 carrying weighted flanges 22—23. These discs are normally seated at 10—11 and bear against springs as 24—25 inserted between them and supporting elements 26—27 mounted on ball bearings 28—29 on shaft 4. These bearings are thrust bearings mounted on shaft 4 between the ribs 6a and bearings 3 as shown.

When the device is assembled as above set forth the part 6—12 divides the interior of the housing into two chambers as 30—31 communicating with each other only through the medium of the passages 18 and 19, and these chambers and the communicating passages are filled with a suitable fluid such as oil.

Assuming now that the engine is idling and the housing 1 is rotating at slow speed the yokes 15 and 17 will rotate slowly in cam groove 14, the passages 18—19 registering slowly enough to permit the oil to flow back and forth between the chambers 30—31, consequently the part 6—12 is not rotated but is caused to reciprocate on the shaft 4 and no power is transmitted to the shaft 4.

If the engine is now speeded up and the housing 1 therefore caused to rotate faster the flow of oil through passages 18—19 is proportionately decreased due to lessened periods of registration. Since the oil is not allowed to flow freely from one chamber to the other it resists the reciprocating movement of the part 6—12 and the power not utilized in reciprocating the parts 6—12 is necessarily applied to imparting a rotary movement to shaft 4, through parts 6—12.

Due to the inertia of the discs 20—21 the rotation of sleeve 6 relative thereto causes them to move outwardly against the resistance of springs 24—25, storing up energy in the springs until it equalizes with the forces applied to the rotation of part 6—12 and transmitting it to shaft 4 through parts 26—29, and that equalization of forces, of course, resists the reciprocating movement of part 6—12, the valve and spring action mutually cooperating to effect a direct driving connection between the housing and shaft for any given load. Whenever the speed of rotation of the housing is increased relative to part 6—12 this operation will continue until the housing 1, shaft 4, and all of the parts inserted therebetween rotate as a unit, all of the power being utilized in rotating the parts and none at all to the reciprocation of the part 6—12.

It may be seen from the foregoing that a perfectly automatic valve action is secured by means of the yokes 15—17 and head 12 with their passages 18—19, and the driving power of the engine may be applied to shaft 4 smoothly and evenly and to any desired degree.

It is to be understood, of course, that while I have herein shown and described but one specific embodiment of the invention, changes in form, construction, and method of assembly and operation may be made within the scope of the appended claims.

I claim:

1. A device of the character described comprising, in combination, a rotatable housing, a driven shaft mounted therein, a member revolubly mounted in the housing to divide the same into chambers and slidably mounted on the shaft but rotationally fixed with relation thereto, said member having a cam groove formed in its periphery and passages communicating with the cam groove and said chambers, driving means seated in said groove and mounted on the housing and having passages formed therethrough adapted to register with the said passages in said member, a weighted member threaded on to said first mentioned member in each chamber and adapted to move longitudinally with respect thereto upon relative rotation thereof, and resilient means inserted between the shaft and each weighted member and adapted to effect a driving connection therebetween.

2. A power transmitting device comprising a revoluble closed cylinder, a driven shaft mounted therein, a piston mounted on the shaft, the piston and cylinder being relatively revoluble and reciprocable, driving means connecting the cylinder and piston whereby relative rotation will impart a relative reciprocating movement therebetween, passages communicating with the cylinder chamber on opposite sides of the piston, and valve means actuated by relative rotative movement between the cylinder and piston for controlling the flow of fluid through said passages.

3. A power transmitting device comprising a revoluble cylinder adapted to contain a fluid, a driven shaft mounted therein, a piston mounted on said shaft, the piston and cylinder being relatively revoluble and reciprocable, driving means connecting the cylinder and piston whereby relative rotation will impart a relative reciprocating movement therebetween, passages communicating with the cylinder on opposite sides of the piston, valve means actuated by relative rotative movement between the cylinder and piston for controlling the flow of fluid through said passages, and resilient means bearing against opposite sides of the piston, and means for causing the resilient means to progressively increase their resistance to the reciprocating movement of the piston proportionally to its increase in speed of rotation.

4. In a device of the character described, the combination of a piston having a cam groove formed in its periphery, a cylinder encompassing the piston, a valve member having transversely disposed passages formed therethrough slidably seated in the groove and mounted on the cylinder, the said piston having passages formed therein communicating with the groove and opposite sides of the piston and adapted to register with the passages in the valve member.

5. In a device of the character described, the combination of a relatively revoluble and reciprocable piston and cylinder, one having a cam groove formed in its periphery in opposed relation to the other, and the other having a valve member mounted thereon and slidably seated in said groove and having transversely disposed passages formed therethrough, and the other having passages formed therein communicating with the groove and with the interior of the cylinder on opposite sides of the piston.

6. A power transmitting device comprising, a revoluble closed cylinder, a driven shaft mounted therein, a piston mounted on the shaft, the piston and cylinder being relatively revoluble and reciprocable, driving means connecting the cylinder and piston whereby relative rotation will impart a relative reciprocating movement therebetween, and valve means inserted between the piston and driving means for controlling the flow of fluid from one side of the piston to the other.

7. In a device of the character described, a revoluble closed cylinder, a driven shaft mounted therein, a piston slidably mounted on the shaft within the cylinder but rotationally fixed relative thereto, the piston and cylinder being relatively revoluble and reciprocable, driving means connecting the cylinder and piston whereby relative rotation will impart a relative reciprocating movement therebetween, valve means inserted between the piston and driving means for controlling the flow of fluid from one side of the piston to the other whereby to control the reciprocating movement of the piston, and means rendered operative by rotation of the piston and cylinder for storing up energy adapted to cooperate with the valve means for controlling reciprocation of the piston.

8. A power transmitting device comprising, a revoluble closed cylinder, a driven shaft mounted therein, a piston slidably mounted on the shaft within the cylinder but rotationally fixed relative thereto, the piston and cylinder being relatively revoluble and reciprocable, driving means connecting the cylinder and piston whereby relative rotation will impart a relative reciprocating movement therebetween, valve means inserted between the piston and driving means for controlling the flow of fluid from one side of the piston to the other, and energy storing means rotationally mounted on the shaft and bearing against opposite sides of the piston, and means rendered operative by rotation of the piston for storing up energy in said last mentioned means whereby to control reciprocation of the piston.

9. A power transmitting device comprising, a revoluble closed cylinder, a driven shaft mounted therein, a piston slidably mounted on the shaft but rotationally fixed relative thereto, the piston and cylinder being relatively revoluble and reciprocable, driving means connecting the piston and cylinder whereby relative rotation will impart a relative reciprocating movement therebetween, valve means inserted between the piston and driving means for controlling the flow of fluid from one side of the piston to the other, oppositely disposed resilient means mounted on the shaft on opposite sides of the piston and bearing against the piston, and means rendered operative by rotation of the piston for placing the resilient means under compression whereby to control the reciprocation of the piston.

10. In a device of the character described, the combination of a relatively revoluble and reciprocable piston and cylinder, one having a cam groove formed in its periphery in opposed relation to the other, and the other having a valve member mounted thereon and slidably seated in said groove, said valve member and piston having transversely disposed communicable passages formed therethrough whereby to control the flow of fluid from one side of the piston to the other upon relative rotation therebetween.

11. A power transmitting device comprising a revoluble closed cylinder, a piston mounted therein, the piston and cylinder being relatively revoluble and reciprocable, driving means connecting the cylinder and piston whereby relative rotation will impart a relative reciprocating movement therebetween, valve means inserted between the piston and driving means for controlling the flow of fluid from one side of the piston to the other whereby to control the reciprocating movement of the piston, resilient means bearing against opposite sides of the piston and rotatable with the piston, and means for causing the resilient means to progressively increase their resistance to the reciprocating movement of the piston proportionally to its increase in speed of rotation.

HENRY E. CURTIS.